United States Patent [19]
Hooper

[11] 3,811,528
[45] May 21, 1974

[54] VEHICLE MOTOR MOUNTS
[75] Inventor: Bernard Hooper, Wordsley, near Stourbridge, England
[73] Assignee: Norton Villiers Limited, Wolverhampton, Stafford, England
[22] Filed: Mar. 29, 1972
[21] Appl. No.: 239,186

[30] Foreign Application Priority Data
Apr. 6, 1971 Great Britain...................... 8829/71
June 30, 1971 Great Britain.................... 30545/71

[52] U.S. Cl. ............................ 180/33 A, 180/64 R
[51] Int. Cl............................................... B60k 5/12
[58] Field of Search .... 180/33 A, 33 R, 33 B, 64 R; 248/3, 9

[56] References Cited
UNITED STATES PATENTS
| 3,722,612 | 3/1973 | Issigonis et al...................... | 180/33 A |
| 3,542,146 | 11/1970 | Hooper.............................. | 180/33 A |
| 3,616,870 | 11/1971 | Kramer.............................. | 180/33 A |
| 2,454,991 | 11/1948 | Cooke................................ | 180/33 B |
| 2,077,628 | 3/1937 | Jordan................................ | 180/33 B |
| 2,574,602 | 11/1951 | Thomas............................. | 180/33 A |

FOREIGN PATENTS OR APPLICATIONS
846,892   12/1938   France............................ 180/33 R Primary Examiner—David Schonberg
Assistant Examiner—Terrance L. Siemens
Attorney, Agent, or Firm—Kurt Kelman

[57] ABSTRACT

This specification describes a motor cycle which includes a frame, a two-cylinder internal-combustion piston engine mounted in the frame, the cylinders of the engine having their longitudinal axes in a common plane containing the rotary axis of the crankshaft which has its crank throws spaced by 180°, a gear box driven by the engine and a driven wheel driven by a final drive from the gear box. The motor cycle has an engine unit which includes the engine, a fork carrying the driven wheel for rotation about a first axis and mounted in a mounting fixed in position relative to the frame for pivotal movement about a second axis, the first and second axes being mutually parallel and parallel to said crankshaft axis, balancing means carried by said crankshaft and which statically balances between 90 and 110 percent of the rotating mass of the engine only, and mountings between the engine unit and the frame to support the engine unit in the frame so that in operation the engine unit oscillates about an axis of oscillation generally perpendicular to an axial plane containing the longitudinal axes of the cylinders, the mountings being arranged so that they resiliently resist oscillatory movement of the engine about said axis of oscillation.

5 Claims, 7 Drawing Figures

VEHICLE MOTOR MOUNTS

BACKGROUND OF THE INVENTION
FIELD OF THE INVENTION

This invention relates to vehicles, hereinafter referred to as being of the kind specified, which include a frame, a two-cylinder internal-combustion piston engine mounted in the frame, the cylinders of the engine having their longitudinal axes in a common plane containing the rotary axis of the crankshaft which has its crank throws spaced by 180°, a gear box driven by the engine and a driven wheel driven by a final drive from the gearbox. The invention is particularly applicable to motor cycles by which we mean to include all steerable, two-wheeled vehicles in which the driven wheel is a road wheel; the invention may also be applied to tricycles having a driven road wheel and snowmobiles which are track laying vehicles; in a snowmobile the driven wheel drives the track.

DESCRIPTION OF THE PRIOR ART

There are two forms of two-cylinder engines in which the cylinders have their longitudinal axes in a common plane. In the first form of engine, known as the 360° twin, the crank pins associated with the two cylinders are in line. In the second form, known as the 180° twin, the crank pins associated with the two cylinders are spaced 180° about the crankshaft axis. Two cylinder engines of the first form have greater out-of-balance forces which have to be absorbed by the engine mountings than do engines of the second form. It is therefore preferred to use engines of the second form in many instances but there is difficulty in absorbing the out-of-balance forces so that they are not passed on to the driver of the vehicle. It is particularly difficult to absorb the out-of balance forces of 180° twin engines because the forces are in the form of a couple and this makes it more difficult to mount an engine of this form than an engine of the first form where the out-of-balance forces, although greater, act in a plane.

In addition to the fact that the out-of-balance forces are smaller in the engine of the second form, engines of this form are preferred particularly for two-stroke operation where it is possible to obtain two firing strokes per engine revolution which enables an efficient engine to be made.

For the foregoing reasons, therefore, it is preferred to use 180° twin engines and it is an object of the invention to provide a vehicle of the kind specified in which the engine is so mounted relative to the frame as to attenuate the vibrations transmitted from the engine to the frame while allowing the driven wheel to be properly located relative to the frame.

SUMMARY OF THE INVENTION

According to the invention we provide a vehicle of the kind specified comprising an engine unit which includes the engine, a fork carrying the driven wheel for rotation about a first axis and mounted in a mounting fixed in position relative to the frame for pivotal movement about a second axis, the first and second axes being mutually parallel and parallel to said crankshaft axis, balancing means carried by said crankshaft and which statically balances between 90 and 110 percent of the rotating mass of the engine (as hereinafter defined) only, and mountings between the engine unit and the frame to support the engine unit in the frame so that in operation the engine unit oscillates about an axis of oscillation generally perpendicular to an axial plane containing the longitudinal axes of the cylinders, the mountings being arranged so that they resiliently resist oscillatory movement of the engine about said axis of oscillation.

When we say that the axis of oscillation is generally perpendicular to said axial plane we mean that the axis of oscillation makes an angle of between 80° and 100° with said axial plane.

Due to the arrangement of the balancing means, the engine will oscillate at low engine speeds and these oscillations will be damped by the mountings. When we refer to the "rotating masses of the engine" we mean the proportion of the mass of each connecting rod which is obtained by weighing the big end of the connecting rod, including the big end bearing, while the little end is freely suspended and assuming that the weight obtained is concentrated at the axis of the crank pin. The balancing means then comprises a weight which is applied diametrically opposite to the axis of the crank pin so as to balance between 90 and 110 percent of the out of balance produced by the mass of the big end portion of each connecting rods. The balancing means will be applied to a crank shaft which is itself balanced and the rotating masses of the engine are not defined as including the crank shaft itself, but only the big end portions of the connecting rods as explained above.

The reciprocating masses of the engine which, for the or each cylinder, comprise the piston, the gudgeon pin and the little end portion of the connecting rod are not specifically balanced and they will produce an out-of-balance force which has its major component acting along the cylinder axis. This out-of-balance force will cause oscillations of the engine which oscillations are damped by the mountings and are therefore attenuated with respect to the frame.

We have found that by using this arrangement it is possible to permit large amplitudes of oscillation of the engine thus reducing the minimum engine speed at which damping of the out-of-balance forces becomes effective as compared with prior known methods of suspension.

Preferably, the sum of the stiffness moments (as hereinafter defined) of the mountings to one side of each of two planes through the axis of oscillation and respectively perpendicular to and parallel to the crankshaft axis is equal to the stiffness moments of the mountings on the other side of the plane.

It will be appreciated that at least some of the mountings must be resilient and we define stiffness of the mounting as the force exerted by the mounting on the engine unit for a unit angular deflection of the engine unit about the axis of oscillation. The stiffness depends on the material from which the mounting is made and also upon the quantity of such material in the mounting. By "stiffness moment" we mean the moment about the axis of oscillation of the stiffness of a mounting.

Thus taking a plane containing the axis of oscillation and perpendicular to the crankshaft axis, the sum of the stiffness moments of the mountings about the axis of oscillation on one side of the plane is preferably equal to the sum of the stiffness moments of the mountings on the other side of the plane. Where a mounting is symmetrically arranged about the plane then its stiffness moments on the two sides of the plane are equal and opposite. Where a mounting is unsymmetrically arranged about the plane then it is necessary to take into account the greater stiffness moment of the greater part of the mounting on one side of the plane as compared with the smaller stiffness moment of the smaller part of the mounting.

We preferably arrange the mountings so that they have a greater compliance (i.e., deflection per unit load) in circumferential directions about the axis of oscillation than in directions radial of said axis. In other words oscillations of the engine unit about said axis are permitted more readily than movement of the engine unit bodily in directions radially of the axis or in directions parallel to the axis.

In one arrangement, the engine unit includes a gear box rigidly interconnected with the engine or formed as a unitary structure therewith and the mounting for the fork is secured to the frame.

This arrangement has the advantages, firstly, that the fork carrying the driven wheel, being mounted on the frame, may be properly located to prevent twisting of the driven wheel about an axis perpendicular to its rotary axis and this is especially important if the driven wheel is a road wheel of a motor cycle.

Secondly, since the engine and gear box are rigidly interconnected or formed as a unitary structure, conventional drive means may be used between the engine and the gear box since there will be no relative movement between them when in use.

According to another arrangement, the gear box is mounted on the frame and the engine unit oscillates relative to the gear box, the mounting for the fork being secured to the frame or to the gear box.

In this arrangement, since the engine is allowed to move relative to the gear box, the latter can be rigidly mounted on the frame or can be mounted in such a way that movements parallel to the first and second axes are prohibited except for working clearance while movements in planes perpendicular to said axes are permitted. The fork carrying the driven wheel may be mounted on the frame or gear box but must be properly located to prevent twisting of the driven wheel, especially if the latter is a road wheel as in the case of a motor cycle.

In this latter arrangement the primary drive loop between the engine and the gear box has to be such as to accommodate the relative movement which is permitted between the engine and the gear box. We have found that such a loop may be in the form of an internally toothed belt which engages belt sprockets on the engine and gear box respectively. Such a belt has to have a pretension and this, and the working tension of the belt, are reacted by the engine mountings.

Depending on the amplitude of the movement of the engine relative to the gear box it may be possible to use a chain of conventional or "silent type" between the engine and the gear box.

In either arrangement the final drive may be in the form of a flexible loop, for example an internally toothed belt or a roller or internally toothed chain in which case the resilient means will be arranged to react against the pull of the chain or belt on the engine unit as drive is taken up.

Alternatively, the final drive may be in the form of a shaft with universal joints between the ends of the shaft and the gear box and driven wheel respectively.

Preferably the arrangement is such that the axis of oscillation passes through the centre of gravity of the engine unit.

The invention has been developed in connection with a two cylinder engine in which the cylinders have their longitudinal axes in a common plane containing the crankshaft axis and in which the pistons are stepped. In such an engine, each cylinder has a working part and a pumping part and each piston has a corresponding working part and pumping part, the pumping parts being of larger diameter than the working parts. The arrangement is such that the pumping part of one cyliner delivers a charge to the working part of the other and vice versa.

In such an engine with the crankshaft throws for the two cylinders being arranged at 180°, due to the weight of the pistons which is greater than normal and due to the fact that they are spaced apart a greater distance than normal there is a greater tendency for the engine to oscillate about the axis of oscillation than in a normal 180° twin engine and therefore a greater need to damp these oscillations.

Two embodiments of the invention will now be described in detail by way of example with reference to the accompanying drawings in which:

BRIEF DESCRIPTION OF THE DRAWINGS

FIG. 4 is a detail view showing a modification of the arrangement shown in FIGS. 1 to 3;

DESCRIPTION OF THE PREFERRED EMBODIMENTS

Figure 1:
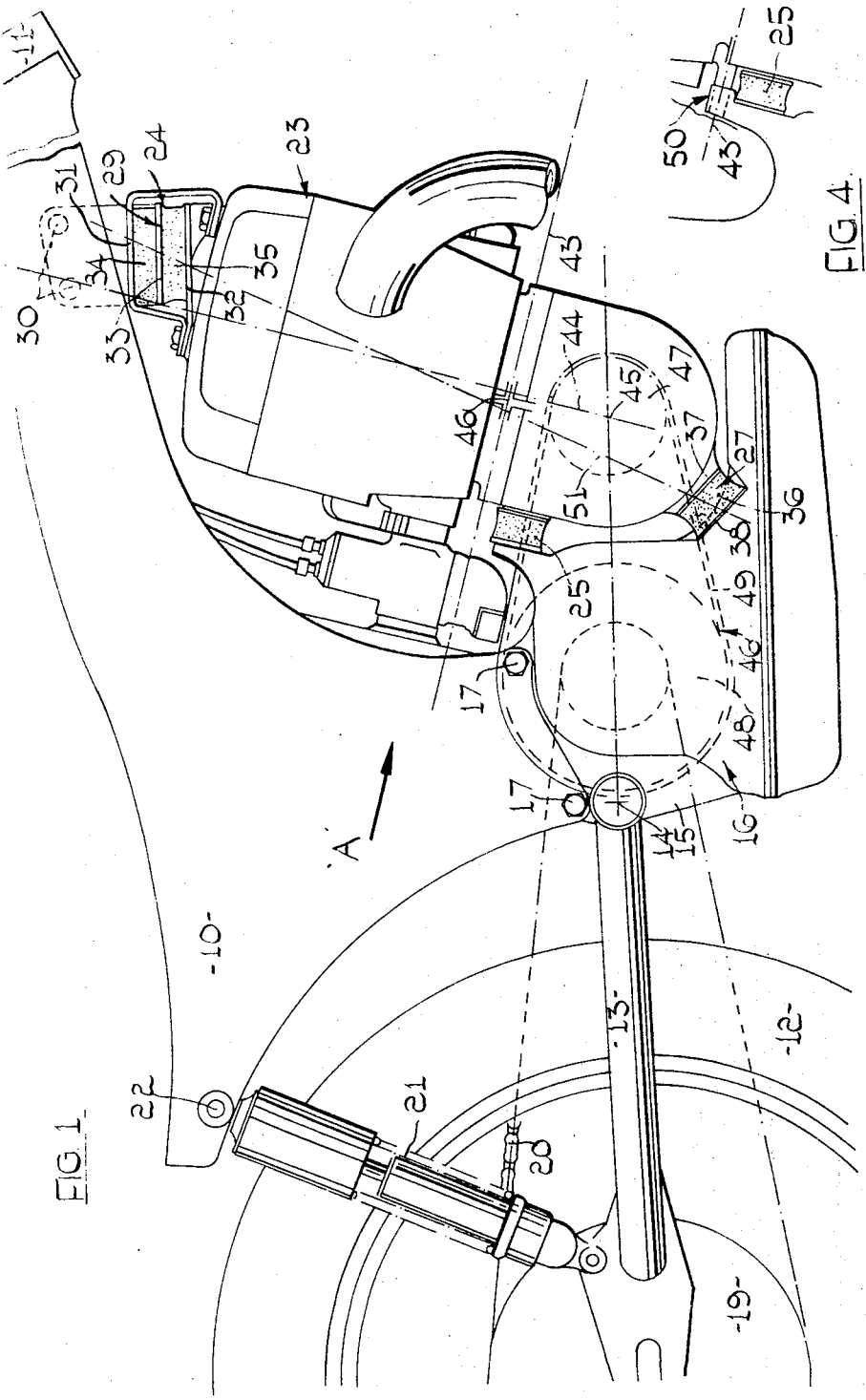
FIG. 1 is a side view of part of a motor cycle constituting a first embodiment of the invention and showing the motor cycle frame and the driven wheel.
Figure 2:
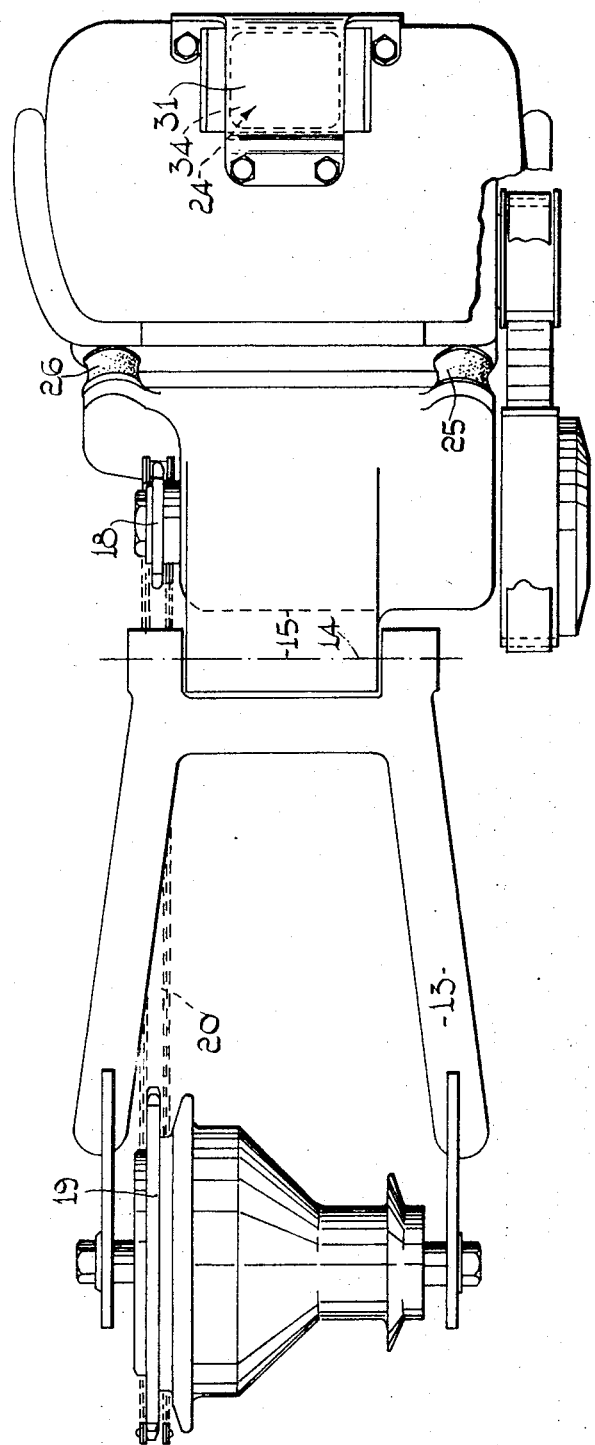
FIG. 2 is a plan view of the part of FIG. 1 with the frame and wheel omitted.
Figure 3:
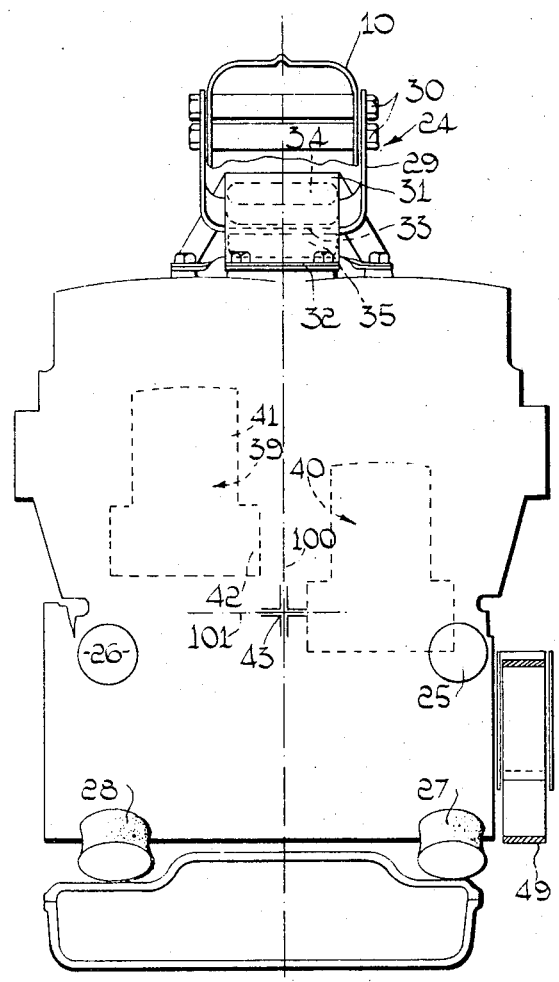
FIG. 3 is a view in the direction of the arrow A in FIG. 1.

Referring now to FIGS. 1 to 3 of the drawings, a motor cycle has a two-cylinder engine with the longitudinal axes of the cylinders in a plane containing the crankshaft and each cylinder containing a stepped piston having a working part and a pumping part received respectively in a working part and a pumping part of each cylinder and so that a charge from the pumping part of one cylinder is delivered to the working part of the other and vice versa.

The motor cycle frame is indicated generally at 10 and has a support 11 at its front end to receive a steering fork and a steerable road wheel, not shown.

The rear driving wheel of the motor cycle is indicated at 12 and is mounted in a fork 13 which is pivoted at 14 to a portion 15 of a gear box indicated generally at 16. The gear box is rigidly bolted to the frame by bolts 17. Since the gear box is rigidly secured to the frame, the fork 13 cannot twist about an axis perpendicular to its axis of pivoting.

The gear box has a drive sprocket 18 and the driven wheel 12 a driven sprocket 19, the sprockets being interconnected by a chain 20 which may be a roller chain or one having internal teeth. The chain may be replaced by an internally toothed belt as will be described below in which case the sprockets 18 and 19 would be replaced by externally toothed wheels capable of driving the chain. The rear end of the fork 13 is connected by conventional suspension units such as 21 to the frame 10 at 22.

The engine is indicated generally at 23 and is supported from the frame by a resilient mounting 24. The engine is further supported by resilient mountings 25 and 26 between the engine and an upper part of the gear box and by further resilient mountings 27 and 28 between lower parts of the engine and the gear box.

Referring first to the resilient mounting 24, this comprises a U-shaped member 29 which is bolted at 30 to the frame. Secured to the cylinder head of the engine is a bracket which has an upper part 31 and a lower part 32 which are generally parallel and parallel to the base 33 of the U-shape member 29. Interposed between the upper part 31 and the base 33 is a block 34 of resilient material and a similar block 35 of resilient material is interposed between the base 33 and the lower part 32.

Referring particularly to FIG. 1, movement of the engine in vertical directions will be resisted by the blocks 34 and 35 in compression and tension whereas movement of the engine in directions parallel to the base 33 will be resisted by the blocks 34 and 35 in shear. The material from which the blocks 34 and 35 is made is such that it has a greater compliance in shear than in compression or tension.

Each of the mountings 25 to 28 is similar and comprises, as shown for mounting 27 in FIG. 1, a block 36 of resilient material bonded to metal discs 37 and 38 secured respectively to the engine and the gear box. Movements of the discs 36 and 38 relative to one another in directions parallel to the discs is resisted by the material of the block 36 in shear whereas movement of the discs 37 and 38 in directions perpendicular to the discs is resisted by the blocks in compression or tension.

As has been mentioned above, the engine is a two cylinder engine having stepped pistons and these are indicated in dotted lines in FIG. 3 and are indicated at 39 and 40. Each piston has a working part which is indicated at 41 of smaller diameter and a pumping part which is indicated at 42 of larger diameter and the arrangement is such that the pumping part of one piston delivers a charge to the working part of the cylinder in which the other piston operates. The crank throws for the pistons are spaced apart at 180° and due to the spacing of the crank throws, the mass of the pistons and the balance of the engine which will be referred to below, the engine has a tendency to pivot and oscillate about an axis of oscillation indicated at 43 in FIG. 1 and which is generally perpendicular to a plane indicated at 44 which contains the longitudinal axes of the two cylinders and also the rotary axis 45 of the crankshaft which is not shown. By generally perpendicular we mean perpendicular within ± 10°. The axis of oscillation 43 also passes through the centre of gravity 46 of the engine unit. The centre of gravity of the engine unit is the centre of gravity of the engine itself together with all parts which are secured thereto and which are therefore supported by the resilient mountings 24 to 28. The parts connected to the engine are items such as the carburettor and the exhaust pipes.

The engine is balanced as described above in that the rotating masses only of the engine are balanced as described by means of a weight which is applied to the crankshaft diametrically opposite to the axis of each crank pin so as to balance between 90 and 110 percent of the out-of-balance produced by the mass of the big end portion of the connecting rod associated with the crank pin as described above. This is the only balance of the rotating parts of the engine, it previously having been explained that the crankshaft itself is balanced. The result of balancing the engine in this manner is to produce a polar load diagram of the out-of-balance forces associated with each cylinder which is elongated along the longitudinal axis of the cylinder so that there are only small forces acting in directions perpendicular to the plane 44.

We have found, therefore, that with an engine as described above, the latter tends to oscillate about the axis of oscillation 43 and these osciallations are damped by the resilient mountings 24 to 28. It will be seen that if the engine tends to oscillate about the axis 43 the resilient material in the resilient mountings 24 to 28 will be deformed in shear and the compliance of the material is greater in shear than in compression or tension.

The stiffness moments about the axis of oscillation of the various mountings as described above are arranged to be equal on each side of two planes containing the axis of oscillation and perpendicular to and parallel to the rotary axis 45 of the crankshaft. These planes are indicated at 100 and 101 in FIG. 3. Thus taking the plane 100, the mounting 24 is symmetrically arranged relative to the plane and therefore its stiffness moment can be neglected because there will be equal and opposite stiffness moments on each side of the plane. The stiffness moments of the mountings 25 and 27 preferably equal the stiffness moments of the mountings 26 and 28. That is to say, taking each of said mountings, the stiffness thereof, i.e., the force exerted on the engine unit due to a unit angular displacement about the axis of oscillation 43, times the effective moment arm of said force about the axis of oscillation does, when added to the stiffness moment of the other mounting on such side of the plane equals the stiffness moments of the other mountings on the other side of the plane. Considering now the plane 101, the stiffness moment of the mounting 24 is preferably equal to the sum of the stiffness moments of the mountings 25 to 28. The mountings are thus arranged so that the engine is constrained to oscillate about the axis 43.

There is a primary drive indicated at 46 between the engine and the gear box, such primary drive comprising a driving element 47 on the engine, a driven element 48 on the gear box and a loop 49 between the driving and driven elements. The loop 49 may be an internally toothed belt which engages the suitably shaped wheels 47 and 48. By using an internally toothed belt, the movement of the engine relative to the gear box can be accommodated while the belt still transmits drive between the engine and the gear box. It may, however, be possible in some circumstances to use a chain of conventional or "silent" type or an internally toothed chain between the engine and the gear box for the driving loop 49.

The resilient mountings 25 and 27 are arranged to resist the pull of the loop 49 tending to move the engine 23 towards the gear box. The mountings 26 and 28 assist in keeping the engine and gear box apart and also balance the mounting of the engine.

We have found with the arrangement described above that the engine oscillates about the pivot axis 43 at low speeds and these vibrations are attenuated both at high and low speeds and are reduced to an acceptable level.

We have further found that by allowing the engine to move relative to the gear box, we have cut down the vibrating mass of the vehicle.

With a two cylinder engine having the features described above, the engine can be forced to pivot about the axis of oscillation 43 by providing a pivotal mounting 50 as shown in FIG. 4 between the engine and the gear box, the pivot axis of the mounting being aligned with the axis of oscillation 43.

It will be noted from FIG. 1 that a central plane such as indicated at 51 in FIG. 1 substantially bisecting the resilient mountings 24, 27 and 38 will make only a small angle with the axial plane 44. Ideally the planes 44 and 51 should be coincident since the oscillations will be taking place about an axis 43 perpendicular to the plane 44 but we have found that good results are obtained even if the plane 51 is inclined to the plane 44 at a small angle such as shown.

If desired the discs such as 37 and 38 of the resilient mountings 27 and 28 may be perpendicular to a radius through the centre of the disc from the axis 43.

Figure 5:
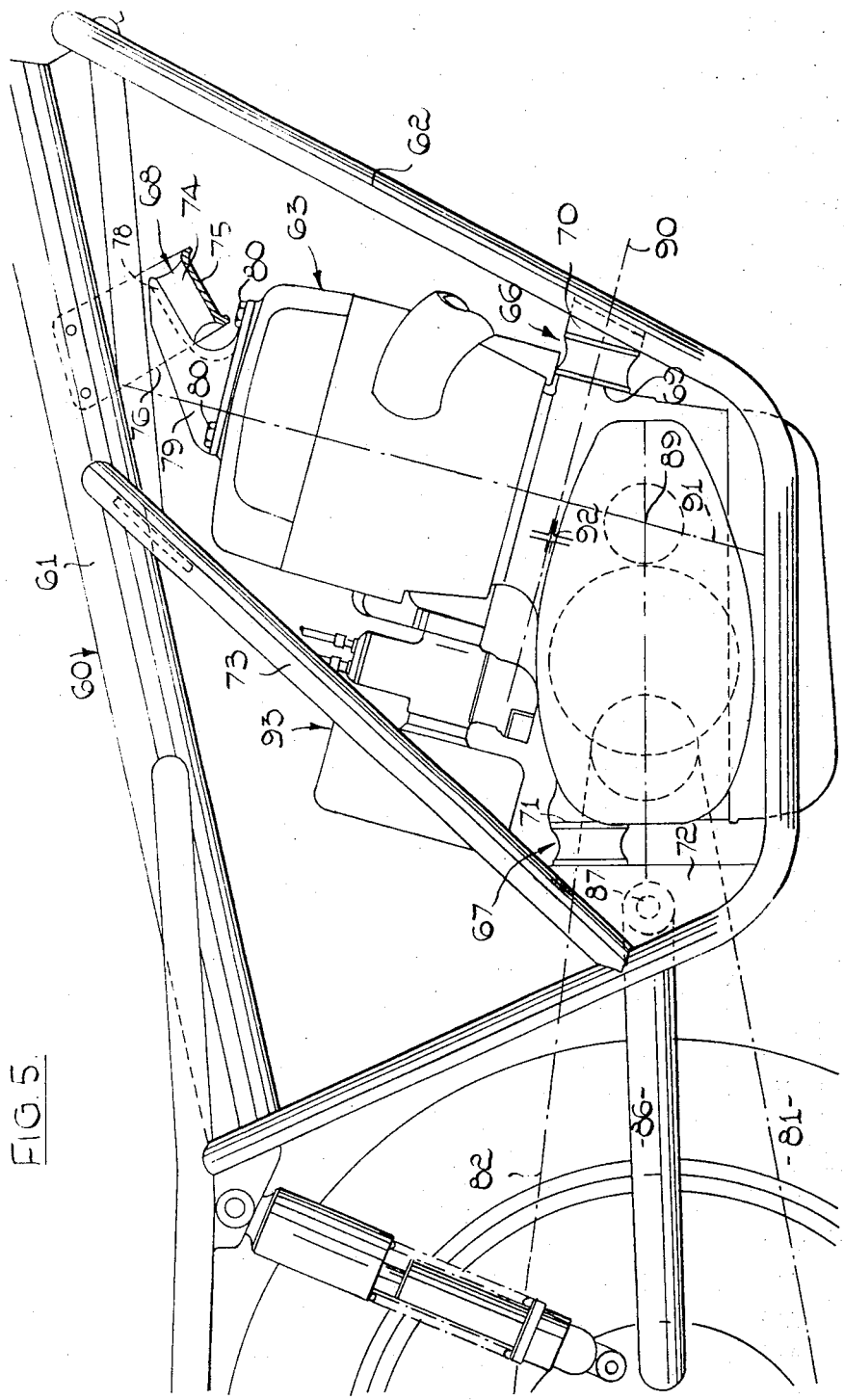
FIG. 5 is a partial side elevation of a motor cycle constituting a second embodiment of the invention and showing the motor cycle frame and the driven wheel.
Figure 6:
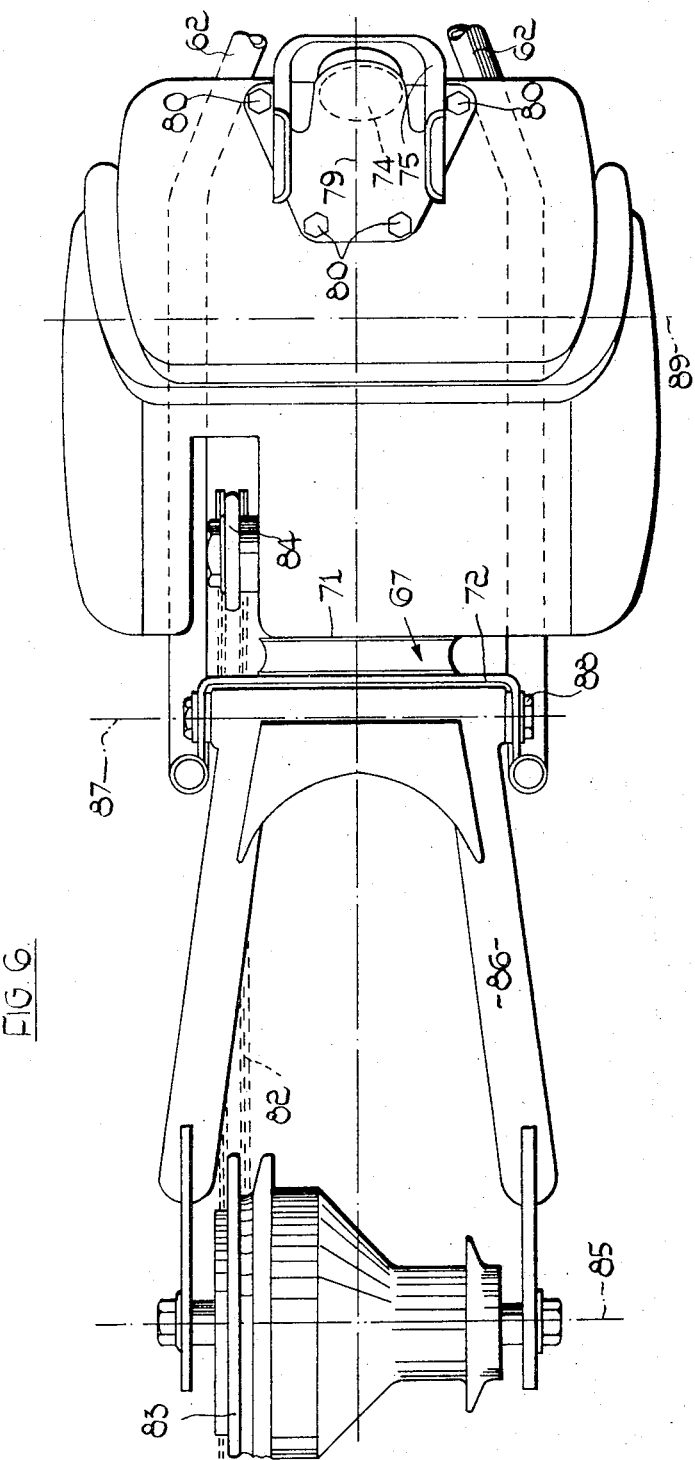
FIG. 6 is a partial plan view of the motor cycle shown in FIG. 5 with the frame omitted.
Figure 7:
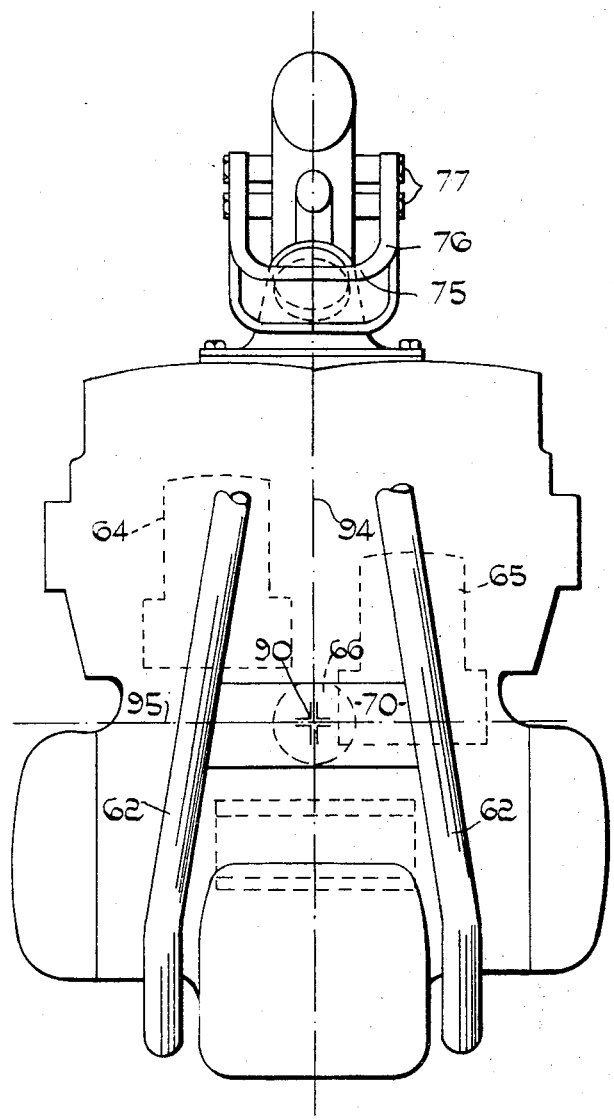
FIG. 7 is a front elevation of the motor cycle shown in FIGS. 5 and 6 with part of the frame omitted.

Referring now to FIGS. 5 to 7 the motor cycle there shown has a frame indicated generally at 60 which comprises a back-bone 61 and a pair of generally U-shaped tubes 62 which provide a cradle for an engine unit indicated generally at 63. The engine unit shown comprises an engine and gear box formed as a unitary structure. The engine is of the stepped piston type and as shown in dotted lines in FIG. 7 the pistons 64 and 65 are connected to crank throws which are spaced apart by 180°.

The engine unit is mounted in the frame by three resilient mountings indicated generally at 66, 67, and 68. The resilient mountings are all of the same general type comprising a block of synthetic rubber having bonded to opposite faces thereof two metal plates which are connected respectively to the engine unit and the frame.

Dealing first with the mounting 66, this is secured to the front of the engine at 69 in a position generally centrally thereof as viewed in FIG. 7 and is also secured to a bracket 70 which extends between the tubes 62.

The mounting 67 is arranged between the rear of the engine at 71 and a bracket 72 which is U-shaped in plan as is clear from FIG. 6 and is connected between the tubes 62 and further triangulating tubes 73. The mounting 67 is arranged generally centrally as is shown in FIG. 6 and has a considerable width in plan view so as to be able to withstand the final drive chain tension as will be described below.

The mounting 68 differs from the mountings 66 and 67 in that the mounting block 74 of resilient material is bonded directly to the base 75 of a U-shaped bracket 76 which has its limbs connected to the back-bone 61 by bolts 77 which pass through the back-bone and carry spacers. The block is also bonded directly to a part 78 of a generally L-shaped bracket 79 which is bolted at 80 to the cylinder head of the engine. As will be seen from FIG. 6 the mounting 68 is arranged generally centrally of the engine when viewed in plan.

The rear road wheel of the motor cycle is indicated at 81 and is driven by a chain 82 entrained around chain sprockets 83 on the wheel and 84 on the engine unit respectively. The wheel is mounted for rotation about a first axis 85 in a fork 86 which in turn is pivotally mounted for rocking movement about a second axis 87 by means of a pivotal mounting 88 on the bracket 72. The axes 85 and 87 are mutually parallel and are parallel to the crankshaft axis 89 of the engine.

As has been mentioned above, the engine is of the stepped piston type and each piston 64 and 65 has a pumping part of larger diameter and a working part of smaller diameter, the pumping part of one piston pumping a charge to the part of the other cylinder in which the working part of the other piston slides. The crank throws for the pistons are spaced apart by 180° and due to the spacing of the crank throws, the mass of the pistons and the balance of the engine which is as described above with reference to FIGS. 1 to 3, the engine has a tendency to pivot and oscillate about an axis of oscillation indicated at 90 in FIGS. 5 and 7. The axis of oscillation is generally perpendicular to a plane indicated by the line 91 which contains the longitudinal axes of the two cylinders and also the rotary axis 89 of the crankshaft. Preferably, as shown the axis of oscillation 90 passes through the centre of gravity 92 of the engine unit. The centre of gravity of the engine unit is the centre of gravity of the engine and gear box together plus any parts which are directly supported thereby such as exhaust pipes, not shown, and the carburettors indicated generally at 93.

As with the arrangement of FIGS. 1 to 4, the stiffness moments of the mountings are preferably equal about two perpendicular planes through the axis of oscillation, the planes being indicated at 94 and 95 respectively. In the arrangement shown, each of the mountings 66, 67 and 68 is symmetrically located relative to each of the planes and therefore the stiffness moments of the two parts of each mounting on either side of each plane are equal and opposite.

Either of the mountings 66 or 67 could be replaced by two similar mountings spaced equally about the plane 94 and in such an arrangement the sum of the stiffness moments with respect to the planes 94 and 95 must be equal as fully described in relation to the mountings shown in FIGS. 1 to 3.

It will be seen that the invention provides a new and effective means of mounting a 180° twin engine so as to attenuate the vibrations thereof caused by the out-of-balance forces.

I claim:

1. A vehicle comprising: a frame; an engine unit mounted on the frame and including a two-cylinder, internal combustion engine having a crankshaft with two crank pins spaced 180° about the rotary axis of the crankshaft, a piston reciprocable in each cylinder, a connecting rod associated with each piston and interconnecting the piston with one of said crank pins through a big end bearing, balancing means on the crankshaft diametrically opposite to each crank pin, each such balancing means being arranged to produce a moment about said crankshaft axis equal to between 90 and 110 percent of the moment about said crankshaft axis produced by the weight of the big end portion of each connecting rod when the other end is freely suspended, such weight being assumed to be concentrated at the axis of the crank pin with which the connecting rod is engaged, the longitudinal axes of the cylinder lying in a common plane containing the rotary axis of the crankshaft and the engine unit tending when the engine is in operation, to oscillate about an axis of oscillation which makes an angle of between 80° and 100° with the common plane; a gearbox, a driven wheel driven by a final drive from the gearbox; a fork carrying the driven wheel for rotation about a first axis and mounted in a mounting fixed in position relative to the frame for pivotal movement about a second axis, the first and second axes being mutually parallel and parallel to the rotary axis of the crankshaft; resilient mountings interposed between the engine unit and the frame to exert restoring forces on the engine unit upon angular displacement of the engine unit about the axis of oscillation, the resilient mountings being so disposed relative to first and second planes containing the axis of oscillation and respectively perpendicular to and parallel to the rotary axis of the crankshaft that the sum of the stiffness moments about the axis of oscillation of said restoring forces exerted by the mountings on one side of each of said planes due to a unit angular displacement of the engine unit about said axis of oscillation is equal to the sum of the stiffness moments about the axis of oscillation of the restoring forces exerted by the mountings on the other side of the respective plane.

2. A vehicle according to claim 1 wherein the resilient mountings are arranged so that they have a greater deflection per unit load in circumferential directions about the axis of oscillation than in directions parallel to said axis.

3. A vehicle according to claim 1 in which the engine unit includes the gearbox which is rigid with the engine and the mounting for the fork is secured to the frame.

4. A vehicle according to claim 1 wherein the gearbox is mounted on the frame and the engine unit oscillates relative to the gearbox, the mounting for the fork being secured to one of the frame and the gearbox.

5. A vehicle according to claim 1 in which each of said pistons and cylinders is stepped having a working part and a pumping part, the pumping parts being of larger diameter than the working parts and in which the pumping parts of the pistons transfer charge from the pumping part of each cylinder to the working part of the other cylinder.

* * * * *